(12) United States Patent  
Hung

(10) Patent No.: US 6,620,613 B2
(45) Date of Patent: Sep. 16, 2003

(54) ORGANIC WASTE DISPOSER

(75) Inventor: Pai-Li Hung, Taoyuan (TW)

(73) Assignee: Hung Pai-Li Co., Ltd., Taoyuan (TW)

( * ) Notice: Subject to any disclaimer, the term of this patent is extended or adjusted under 35 U.S.C. 154(b) by 0 days.

(21) Appl. No.: 10/138,372

(22) Filed: May 6, 2002

(65) Prior Publication Data

US 2003/0036190 A1 Feb. 20, 2003

(30) Foreign Application Priority Data

Aug. 20, 2001 (TW) ...................................... 90214204 U

(51) Int. Cl.$^7$ ................................................. C12M 3/00
(52) U.S. Cl. ................. 435/290.2; 435/435; 435/290.1; 435/290.4
(58) Field of Search ........................... 435/290.1, 290.2, 435/290.4

(56) References Cited

U.S. PATENT DOCUMENTS 5,591,635 A * 1/1997 Young et al. ............. 435/286.1
5,710,042 A * 1/1998 Shindo et al. ......... 3435/290.1
5,744,351 A * 4/1998 Bryan-Brown ........... 435/290.2
5,866,409 A * 2/1999 Nibu ....................... 435/290.2

* cited by examiner

Primary Examiner—David A. Redding
(74) Attorney, Agent, or Firm—Leong C. Lei

(57) ABSTRACT

An organic waste disposer includes a frame having a plurality of heating plates, a driving device, a treating trough, a stirring device, a final treating container, a water collection device, etc. In disposing the organic waste, the organic waste being added with a yeast (for instance, Bio) is placed into the treating trough for fermentation, and in combination with the stirring device and natural micro-organism decomposition, the organic waste is decomposed to form feeds or organic fertilizer, which are collected by the final collection container. The odor and moisture of the organic waste are removed and collected by the water removing device.

5 Claims, 7 Drawing Sheets

ORGANIC WASTE DISPOSER

BACKGROUND OF THE INVENTION

1. Field of the Invention

The present invention relates to an organic waste disposer, and in particular, a treating device to treat organic waste to become useful material and function to protect the environment.

2. Description of the Prior Art

The conventional methods of waste treating are listed below and the disadvantages thereof are discussed there below:

(1) Burial Method: The obtaining of vacant land for waste burial is difficult and this method may produce secondary pollution such as unpleasant smell, waste water, worms, flies, bacterial, etc.

(2) Combustion/Burning method: The cost of burning is increasing and the temperature of the combustion furnace is reduced. Besides, there are numerous plastics or chemicals that cannot be fully burnt. In addition, poisonous gas may be produced such as dioxine, $CO_2$, CO, sulfides. This poisonous may toxin human health. The life-span of the furnace is limited.

(3) Sea-burial. The organic waste will contaminate seat water.

In view of the above, it is an important object of the present invention to provide a treating device for organic waste so as to mitigate the above drawbacks.

SUMMARY OF THE INVENTION

The present invention relates to an organic waste disposer.

It is the primary object of the present invention to provide an organic waste disposer which can convert organic waste into useful material and function to protect the environment.

It is another object of the present invention to provide an organic waste disposer which is compact in size.

It is still another object of the present invention to provide an organic waste disposer which is simple in construction.

It is still another object of the present invention to provide an organic waste disposer which can be easily operated.

It is a further object of the present invention to provide an organic waste disposer which is designed for protecting the environment.

According to a preferred embodiment of the present invention, an organic waste disposer includes a frame in the shape of a box body having one side provided with wire for external power source connection, said frame having an electrical switch for controlling power, a front side of said frame being provided with an openable flap on which is mounted a transparent window, two opposite sides of said frame being each provided with a handle and an openable door, a top of said frame being formed with an opening, a driving device installed on an inside bottom of said frame and having a motor drivingly connected to an axle of a stirring device, a treating trough provided interiorly with said stirring device and provided with a plurality of heating plates on surface thereof, said axle of said stirring device being provided with a plurality of stirring rods, a final treating container having an upper end connected with a discharge outlet of said treating trough, a rotating ring connector being provided between said final treating container and said discharge outlet, said final treating container having a tubular portion which is in communication with interior of said final treating container, an activated carbon filter being fitted in said tubular portion for removing odor, a water collection device having a hollow center and having two lateral sides provided with flexible conduits for connection with said treating trough, one of said flexible conduits being provided with an air circulating device;

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PRESENT INVENTION

Figure 1:
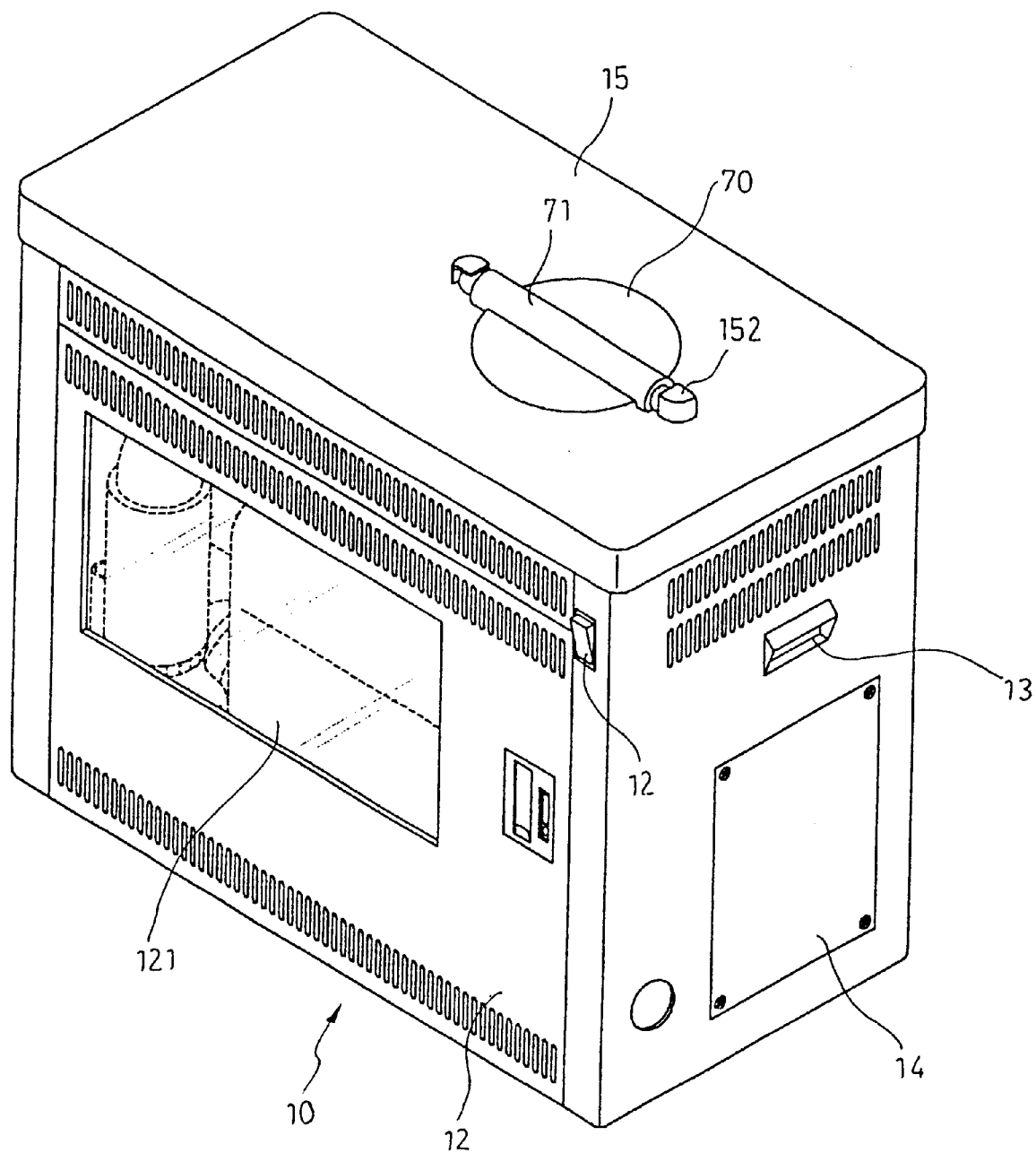
FIG. 1 is a perspective view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, alterations and further modifications in the illustrated device, and further applications of the principles of the invention as illustrated herein being contemplated as would normally occur to one skilled in the art to which the invention relates.

Figure 2:
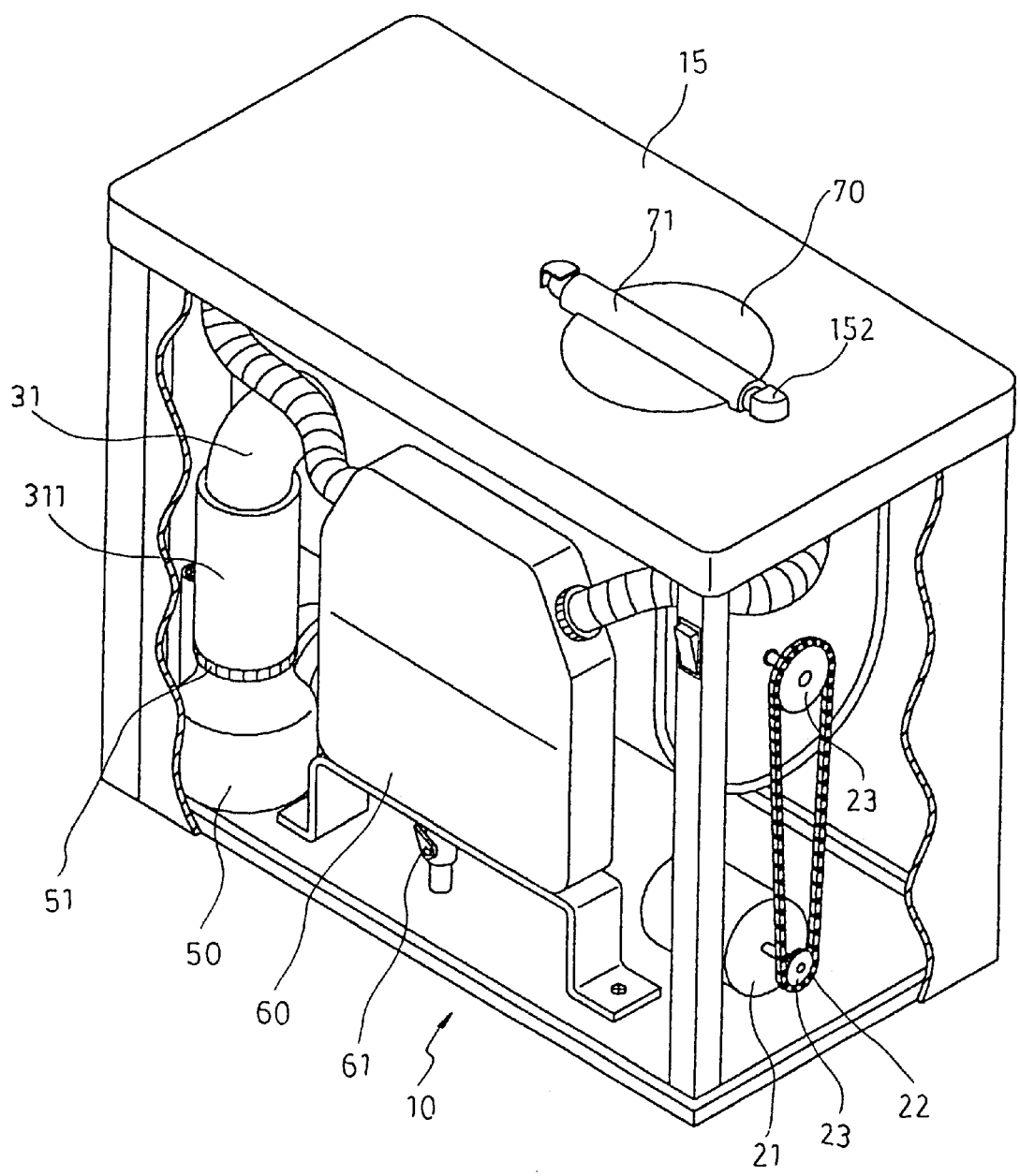
FIG. 2 is a cutaway view of the present invention.
Figure 3:
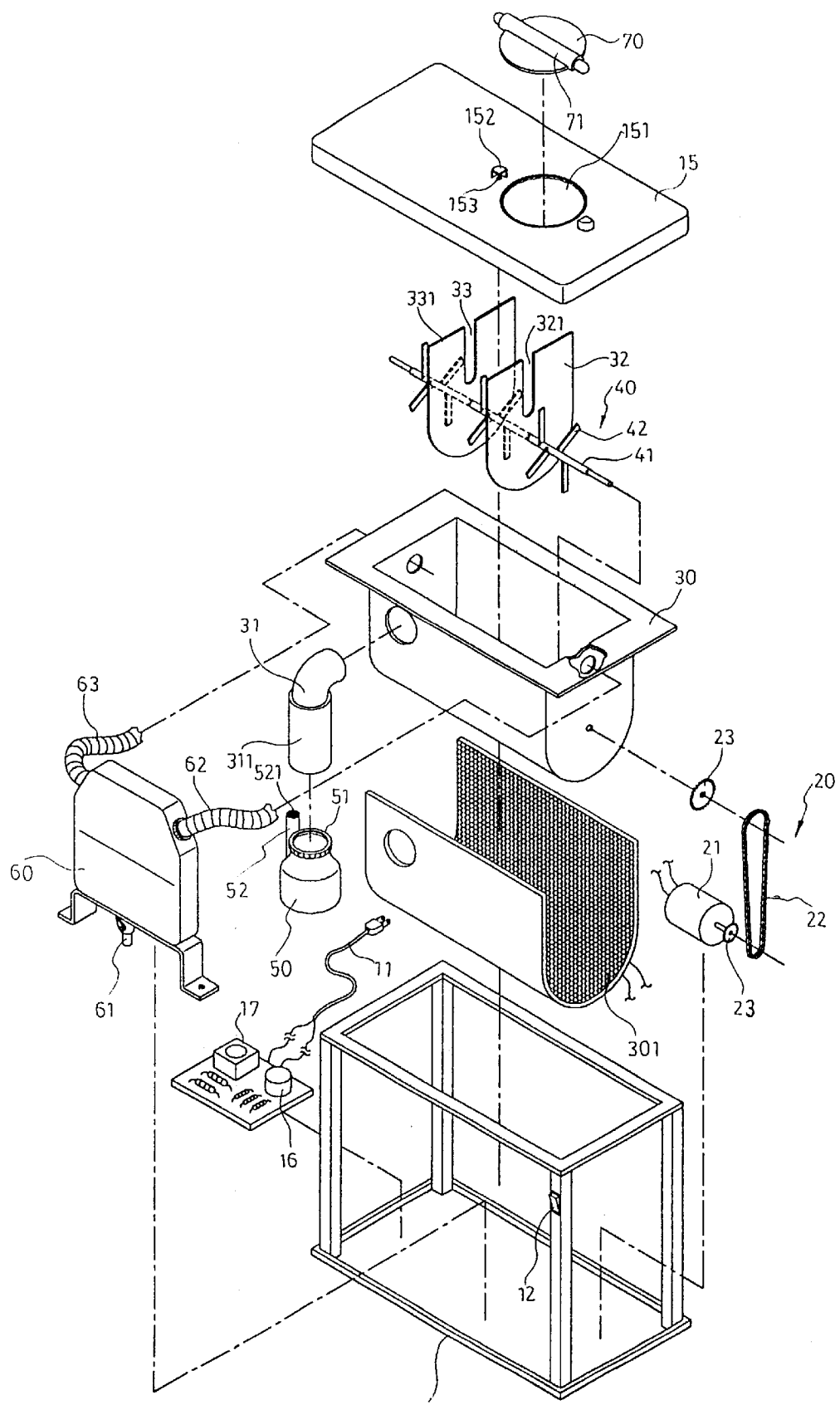
FIG. 3 is an exploded perspective view of the present invention.

Referring to FIGS. 1, 2 and 3, there is shown a treating device for organic waste comprising a platform 10, a driving device 20, a treating trough 30, a stirring device 40, a final treating container 50, a water collection device 60.

The frame 10 is substantially a box body containing all the related devices within the interior thereof. One side of the box body is provided with wire 11 for external power source connection. The frame 10 has an electrical switch 12 for controlling the power. The front side of the platform 10 is provided with an openable flap 12 on which is mounted a transparent window 121 for inspecting whether the level of water collection device exceeds the predetermined value and facilitating the withdrawal of the final treating container 50 which contains organic fertilizers or feeds. Two opposite sides of the frame 10 are each provided with a handle 13 for making it easier to hold and an openable door 14 for facilitating maintenance of internal components. The top 15 of the frame 10 is formed with an opening 151 such that the organic waste can be placed into the opening 151. When the device is not in use, a top cover 70 is used to close the opening 151.

The driving device 20 is installed on the inside bottom of the frame 10 and includes a motor 21 which is connected to the axle 41 of the stirring device 40 via a chain 22, thereby enabling the stirring device 40 to be driven by the motor 21.

The treating trough 30 is provided interiorly with the stirring device 40, and an appropriate position of the side of the trough 30 is provided with a discharge outlet 31 for the discharging of the organic fertilizers, feeds after treatment of the organic waste. The discharged fertilizer and feeds through the outlet 31 are collected at the collection container 50. In accordance with the present invention, the discharge outlet 31 is provided at the top section of the trough 30 to prevent the water contents of the organic waste from directly discharging through the discharge outlet 31 before the evaporation process. The surface of the trough 30 is provided with a plurality of heating plates 301, which produces appropriate temperature and is controlled by a temperature controller 16 at one wall of the trough 30. The temperature is set between 38° C. to 45° C., and at a maximum of 80° C. The trough 30 is divided into a first chamber 30a, a second chamber 30b and a third chamber 30c by first and second partitions 32 and 33. The first and second partitions 32 and 33 are respectively formed with notches 321 and 331 such that the organic waste can enter the second chamber 30b via the notch 321 from the first chamber 30a by the stirring of the stirring device 40 and then enter the third chamber 30c via the notch 331 from the second chamber 30b.

The stirring device 40 has a rotating shaft 41 passed through the partitions 32 and 33 and there are a plurality of stirring rods 42 located within the treating trough 30, facilitating the stirring of the organic waste in the treating trough 30.

Figure 7:
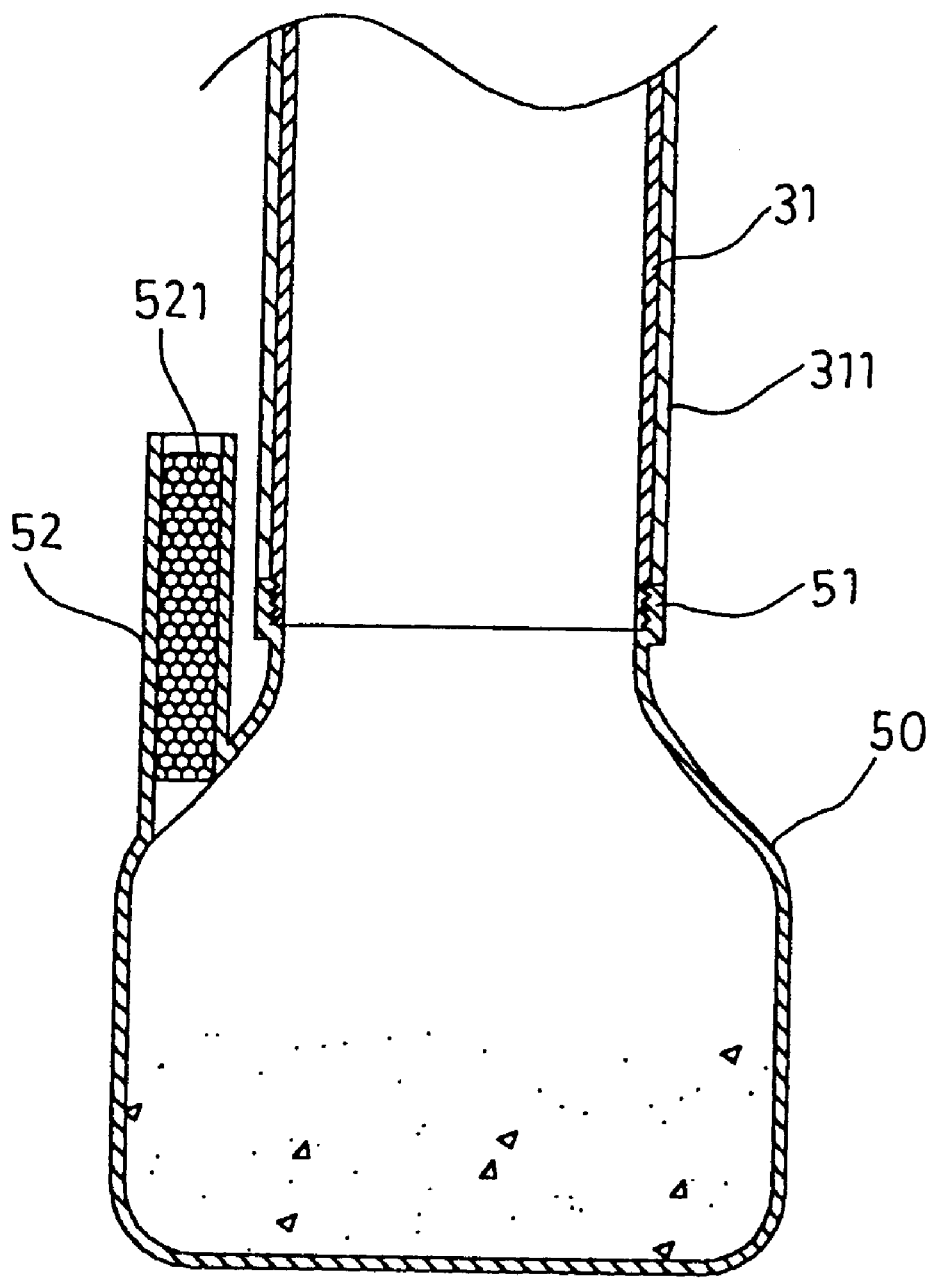
FIG. 7 is a sectional view of the collection container of the organic waste treating device of the present invention.

As shown in FIG. 7, the upper end of the final treating container 50 is connected with the discharge outlet 31 of the treating trough 30. Thus the treated organic fertilizers, and feeds can be conveniently collected at the final treating container 50. A rotating ring connector 51 is provided between the final treating container 50 and the discharge outlet 31 such that the user can rotatably separate the final treating container 50 from the discharge outlet 31 after the collection of fertilizer and feeds. The final treating container 50 has a tubular portion 52 which is in communication with the inside of the final treating container 50. An activated carbon filter 521 is fitted in the tubular portion 52 for removing odor.

The water collection device 60 has a hollow center and is used to collect the water discharged from the treating trough 30 after treatment of the organic waste water is discharged from the tap 61 located at the bottom section. The two lateral sides of the water collection device 60 are provided with flexible conduits 62 and 63 for the connection with the treating trough 30, wherein the flexible conduit 63 is provided with an air circulating device 631 to provide air circulation for the treating trough 30.

Figure 4:
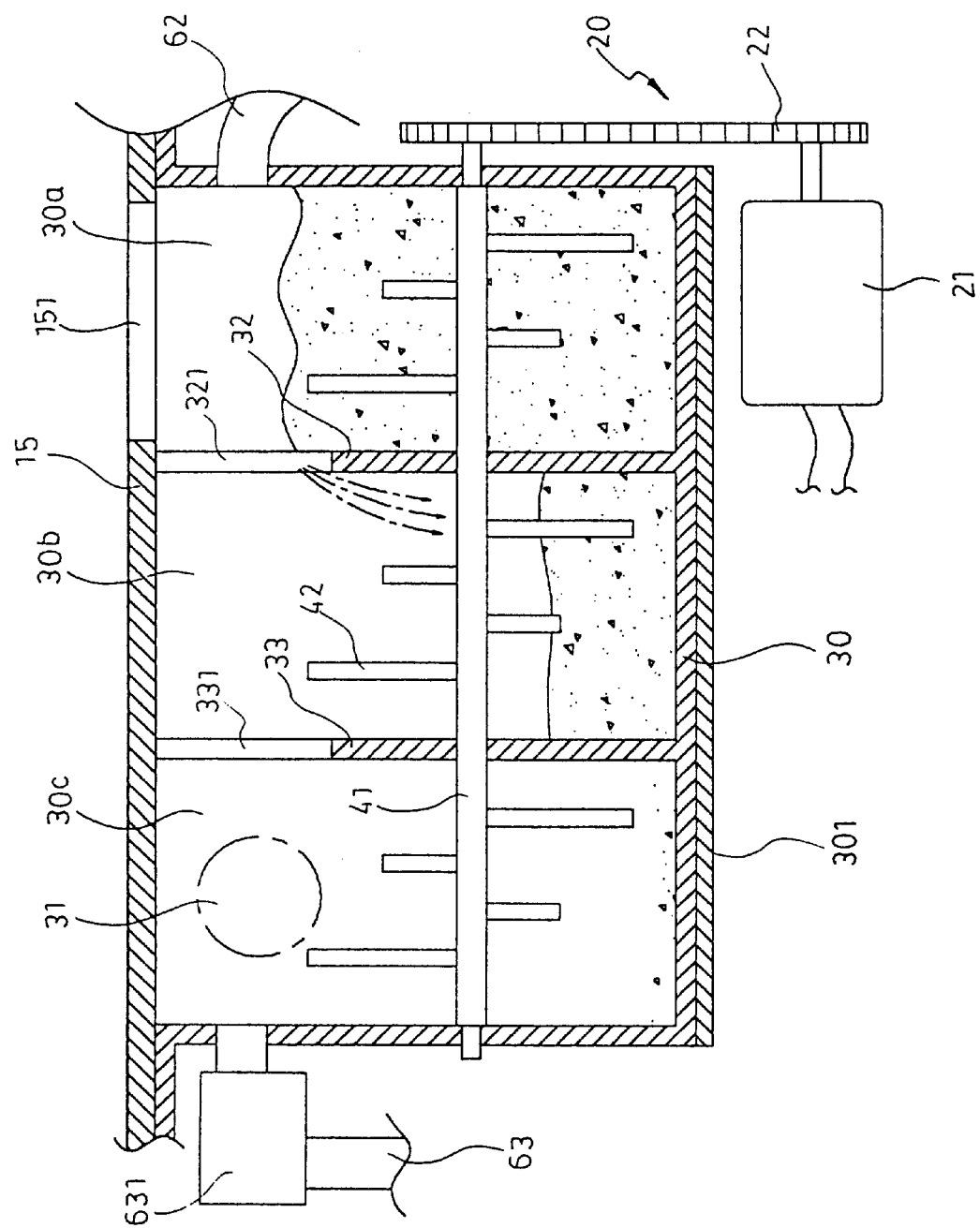
FIG. 4 is a schematic view showing the interior structure of the treating device of the present invention.
Figure 5:
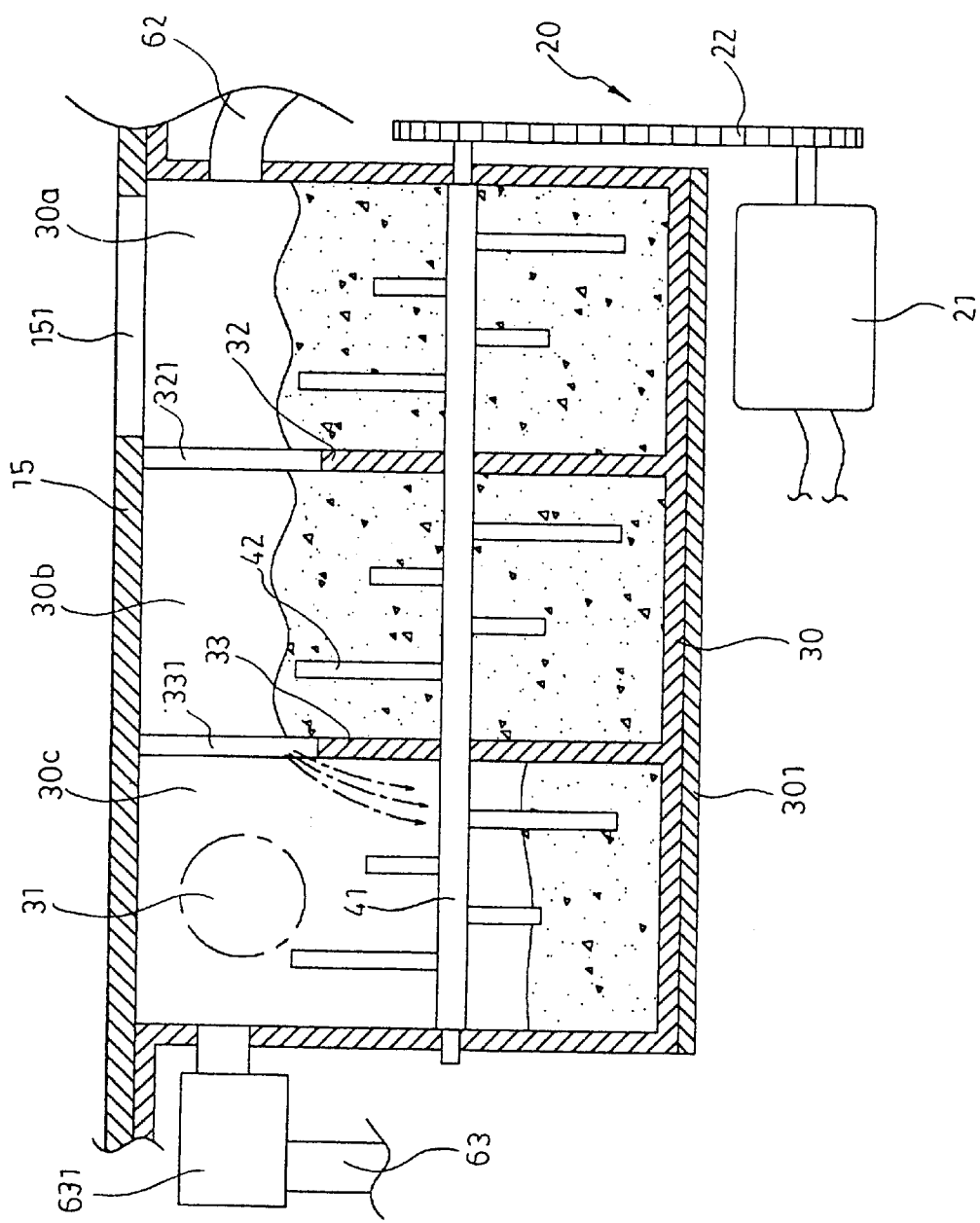
FIG. 5 is another schematic view showing the interior structure of the treating device of the present invention.

Referring to FIGS. 4 and 5, there is shown the actual operation of the device in accordance with the present invention. Organic waste such as waste foods from the kitchen, fruit peels, etc are placed into the treating trough 30 via the opening 151 and an appropriate amount of yeast (for instance, Bio) is added and the temperature is controlled by the temperature controller 16 and the timer 17 (being set at between 38° C. to 45° C.) and an appropriate rotating time. In operation, the stirring rod 42 agitates the waste within the treating trough 30. As a result of microbiological decomposition, and the heating process, water contents of the organic waste are evaporated. The water evaporated from the organic waste is transmitted to the water collecting device 60 via the flexible conduits 62 and 63, and the odor of the waste will be removed by the activated carbon filter 521 to avoid air pollution. The waste in the treating trough 30 is first stirred at the first chamber 30a by the stirring device 40 and then automatically discharged to the second chamber 30b via the notch 321 and stirred at the second chamber 30b for finer stirring process. Thereafter, the waste is discharged to the third chamber 30c via the notch 331 and stirred at the third chamber 30c for final stirring process. The final treated organic fertilizer are automatically placed into the outlet 31 and then collected by the final treating container 50.

Figure 6:
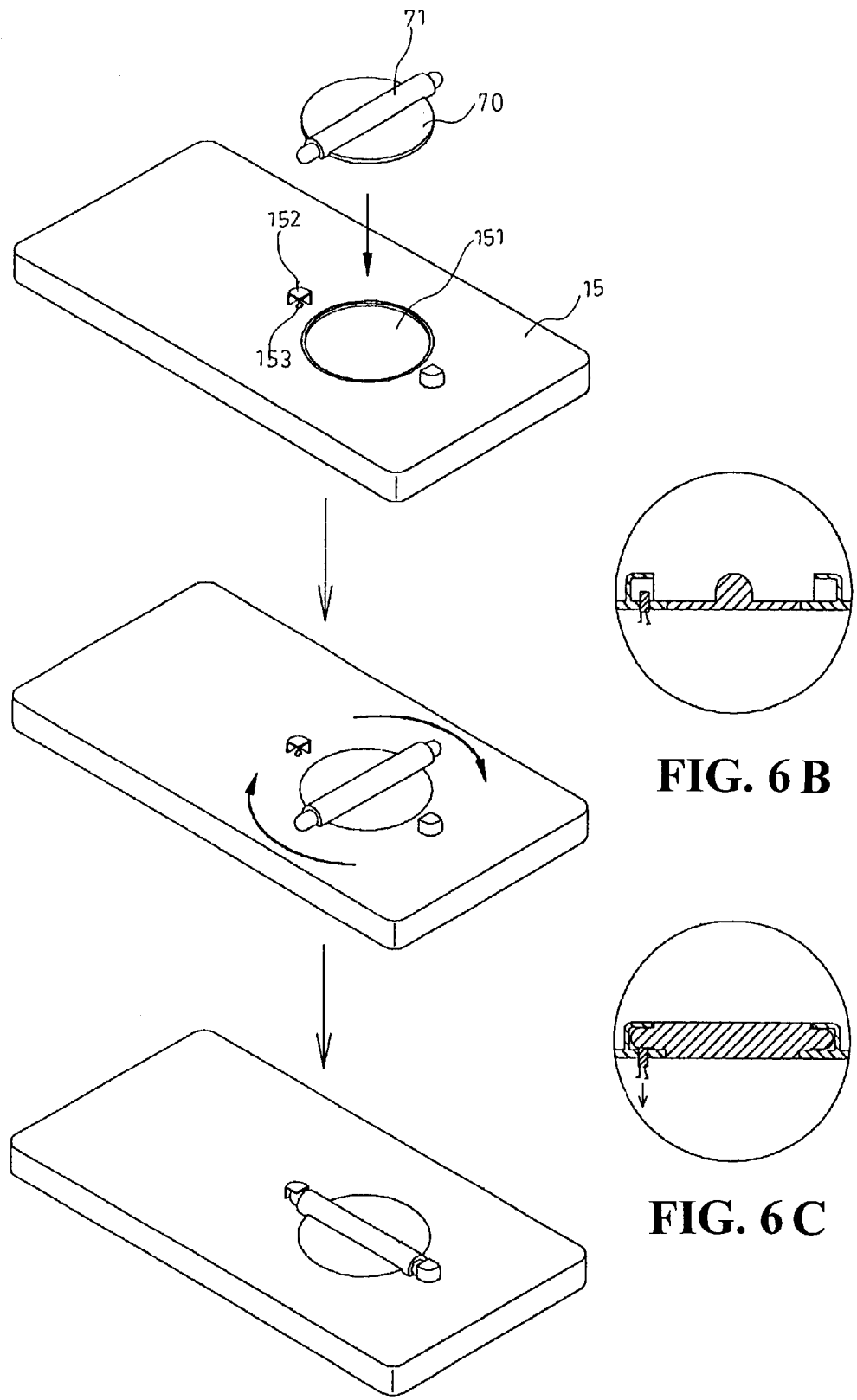
FIG. 6A illustrates three views showing the operation of the cover.
FIGS. 6B and 6C are enlarged sectional views of different portions of FIG. 6A.

Referring to FIGS. 6A, 6B and 6C, after the organic waste has been thrown into the opening 151, the top cover 70 is turned so that the two ends of the handle 71 are fitted into two seats 152 on the top 15 of the frame 10 thereby triggering the micro-switches 153 and therefore switching on the present invention. The micro-switches 153 are electrically connected with the power supplied to the motor. Hence, even if one puts his or her hands into the opening 151 inadvertently, he or she will not be injured because the present invention cannot be turned on to operate unless the top cover 70 is correctly engaged with the seats 152.

In view of the above, the present invention provides the following advantages:

The device has a small volume and does not occupy space. Due to its simple structure and the small volume, the device can be kept at home or outside the house.

Non-stop operation: Any kitchen waste produced at any time can be processed to treatment.

Easy operation: The device can be operated automatically. It starts operating when the device is connected to a power source.

Convenient: The one addition of the yeast can last for an appropriate long time. Thus, it is a cost-saving device.

Reduce the volume of waste: The organic waste is decomposed within a short period and therefore the volume of the waste will be reduced to $\frac{1}{5}$ to $\frac{1}{10}$.

Recycle of natural resources: The treated waste is collected as organic fertilizer of animal feeds depending on the time of fermentation of the waste.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An organic waste disposer comprising:
   a frame in the shape of a box body having one side provided with wire for external power source connection, said frame having an electrical switch for controlling power, a front side of said frame being provided with an openable flap on which is mounted a transparent window, two opposite sides of said frame being each provided with a handle and an openable door, a top of said frame being formed with an opening;

a driving device installed on an inside bottom of said frame and having a motor drivingly connected to an axle of a stirring device;

a treating trough provided interiorly with said stirring device and provided with a plurality of heating plates on surface thereof;

said axle of said stirring device being provided with a plurality of stirring rods;

a final treating container having an upper end connected with a discharge outlet of said treating trough, a rotating ring connector being provided between said final treating container and said discharge outlet, said final treating container having a tubular portion which is in communication with interior of said final treating container, an activated carbon filter being fitted in said tubular portion for removing odor;

a water collection device having a hollow center and having two lateral sides provided with flexible conduits for connection with said treating trough, one of said flexible conduits being provided with an air circulating device;

whereby organic waste such as waste foods from the kitchen, fruit peels, etc are placed into said treating trough via said opening and an appropriate amount of yeast is added and by means of agitation and as a result of microbiological decomposition and heating process, water contents of said organic waste are evaporated and water evaporated from said organic waste is transmitted to said water collecting device and odor of said waste will be removed by activated carbon filter to avoid air pollution, and final treated organic fertilizer are automatically placed into said outlet and then collected by said final treating container.

2. The organic waste disposer as claimed in claim 1, wherein said frame is provided with a temperature controller and a timer.

3. The organic waste disposer as claimed in claim 1, wherein said top cover is provided with a handle and said top of said frame has two opposite seats adapted to receive two ends of said hand, said seats being each provided with a micro-switch electrically connected with a power source of said disposer.

4. The organic waste disposer as claimed in claim 1, wherein said outlet is provided with heating plates.

5. The organic waste disposer as claimed in claim 1, wherein the treating trough is divided into three chambers by two partitions each having a notch at an upper edge thereof.

* * * * *